May 21, 1940.    D. E. HARDIE    2,201,230
APPARATUS FOR ASCERTAINING THE DEPTH FOCUS OF A LENS
Filed June 8, 1938
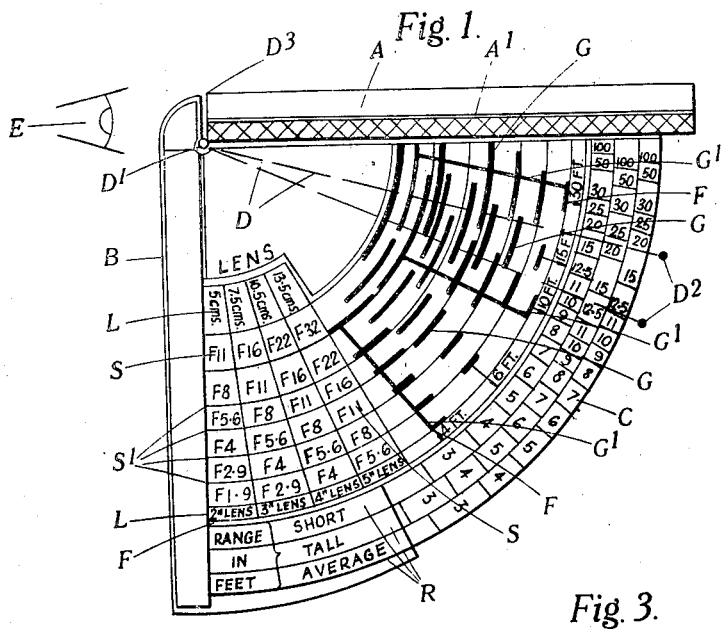
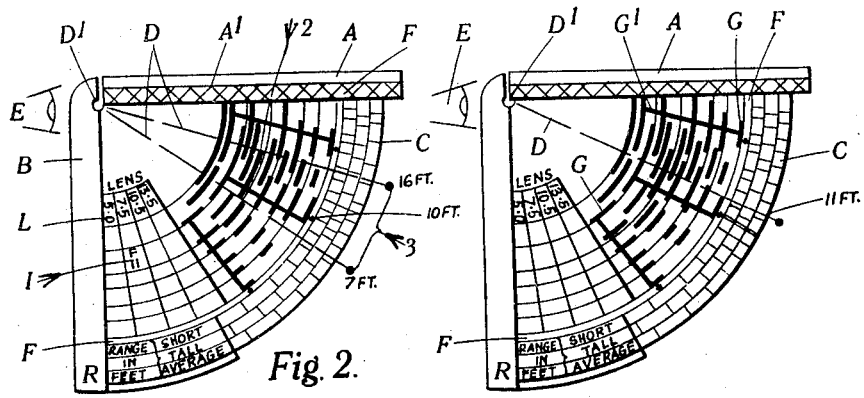
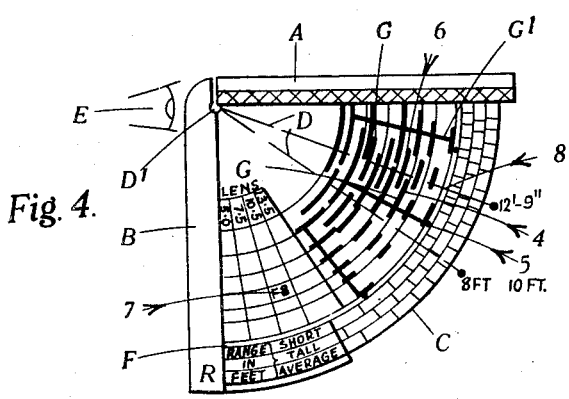
INVENTOR:
DONALD ERIC HARDIE
BY: Francis E. Boyce
ATTORNEY Patented May 21, 1940

2,201,230

UNITED STATES PATENT OFFICE 2,201,230

APPARATUS FOR ASCERTAINING THE DEPTH FOCUS OF A LENS

Donald Eric Hardie, Finchley, London, England

Application June 8, 1938, Serial No. 212,407
In Great Britain June 11, 1937

5 Claims. (Cl. 33—71)

This invention relates to an apparatus for ascertaining the depth focus of a lens such as a camera lens and other purposes. It may be termed a finder of hyper-focal distances, or in other words, a camera lens at a given aperture focussed at a given scale setting will give critical definition on the film or plate between strictly definable limits. Beyond these limits the critical focus shades off from sharp to a blur. An alteration in the size of stop or aperture used from larger to smaller (all other settings being the same) increases the depth of critical focus.

Owing to the variation of these depths for different focal lengths of a lens, aperture and scale setting has hitherto been very difficult to gauge, in order to ascertain the correct zone focus. The zone distance being the depth of focus within which critical definition is obtainable.

The primary object of the invention is the production of a simple and efficient apparatus, which does not need to employ lenses or prisms, and which will enable a high standard of enlargement to be obtained when using ordinary cameras for focussing by scale. The device may be easily carried in the pocket and will not be rendered inoperative by rough usage. The apparatus is designed to cover:

1. Accurate measurement of the depth of a given zone.

2. To enable the selection of the best focussing scale setting of the camera to be used with a given focal length at the most convenient aperture or stop.

3. To indicate what stop is to be used where the scale setting is to be fixed.

4. To give the operator the scale setting or distance the operator is to stand away from the object when the local length of lens and stop to be used are known or fixed.

In describing my invention in detail, reference is made to the accompanying drawing, similar letters indicating similar parts in which:

Fig. 1 represents a view of the device and the charts incorporated thereon.

Figs. 2-4 represent similar views to that shown in Fig. 1 to a smaller scale arranged to show the use of the apparatus for some of the problems it is intended to answer and hereinafter referred to.

To carry my invention into effect I utilize a preferably flat sheet of metal or other suitable material of quadrant formation. The upper edge A or face below same may be termed a sighting edge or like for the eye E looking from the rear vertical edge B. A sighting bar or line $A^1$ will be provided some little distance below the edge A. Particulars L as to lens sizes and focal lengths in centimetres and inches along with stop indicators S will be provided towards the sighting edge A or bar $A^1$.

Upon, above, or between, an arcuate line or lines $S^1$ a focussing setting scale F hereinafter referred to is provided and below such line or lines a series of distance indicators R are provided according to whether the user be short, tall, or average. The average range scale being on or towards the outer curved edge C.

Upon, above, and between the lines $S^1$ are plotted a series of what I term shadow cone guides G, such cone guides being plotted from standard optical calculation, and are used to indicate the angular measure of hyper-focal distance when projected on to the ground by the use of the sighting or selector members D indicated by broken lines, which lines may be in the form of wires operating from a pivot point $D^1$ their ends $D^2$ extending to the curve C. I have found in practice that ordinary elastic bands form exceedingly efficient selectors and to accommodate same in simple manner a slot $D^3$ is cut from towards the upper rear edge of the edge A to a somewhat rounded aperture $D^1$ to form the pivot. This arrangement permits the easy manipulating and correct positioning of the selectors, and renders their renewal easy.

Certain of the shadow curves G are connected by radial lines $G^1$ which point to a terminate at about the focussing setting indications scale F.

From above it will be seen that the device provides:

1. Three scales of distances selectable to the height of the user R.

2. Focal length of lenses L and stops S for each focal length between.

3. A series of depth focus shadows G available, if say the camera is focussed on a distance of four feet, one shadow only being applicable to the stop used. Four or more other series of the similar shadows G will be given such as for 6, 10, 15, and 30 ft. settings of camera focussing scales respectively. The 4, 10, and 30 ft. shadows being connected by radial lines $G^1$ in order to enable the user to rapidly distinguish them from the 6 and 15 ft. lines where they overlap.

4. Rubber or like sighting or selector bands D.

5. A sighting line or like at towards the upper edge of the device.

It is now perhaps advisable to illustrate examples of the use of the device and give simple instructions therefor.

The device is to be placed to the left hand corner of the left or right eye, whichever is preferred, when using the top edge or sighting bar, sight along the sight bar which will generally be substantially in line with the pivot $D^1$. If, however, glasses are worn, the eye should be close to the glass lens and sighting should be along the top edge of the device.

For finding and visualising depth of focus, which as generally known depends on:

(a) Focal length of lens used.
(b) Stop used.
(c) Setting of focussing scale.

Referring to Fig. 2 the focal length is given at L and the stop selected or to be selected in the column S; presuming the lens is a 7:5 cms. one and it is decided to use $F^{11}$. The arrow 1 in Fig. 2 points to the stop column for this and also points to the lens column, looking along the arcuate lines you find a shadow common to both the stop and to the focussing setting you intend to use, say 10 ft. place the bands D so that they touch the ends of the selected shadow G to which arrow 2 is pointing. Reading off on the outer edge between the bands D you know the depth of focus at your disposal, i.e., from about 7 to 16 ft. (see double arrow 3.) If now you place the device to your eye and look along the selectors D you will be able to distinguish the two points on the ground between which you will instruct your subject to stand. If you cannot move your subject, you yourself must move forward or backward until the same result is achieved. The above is assumed on the average height of user.

Users of the short or tall scale must re-set the depth reading on their own scale before visualising.

In order to obtain accuracy it will in many cases be desirable to ascertain the distance an object, group or the like, is away from the user, and to obtain this distance the device is placed as before described and the sight line held as level as may be, and a sight taken along it, to a selected point at eye level.

Maintaining the device with its sight line or top edge level move one of the sight lines D downwards at an angle until along it is sighted a point on the ground level directly beneath the base of the object to be photographed. Then read off the distance on the desired outer scale, suitable to the user's height say 11 ft. and see line D Fig. 3. This scale can be selected or verified by standing at a measured distance from an object placed on the ground and adjusting the sight line or band D as above and adopt the range scale which gives a reading nearest to the measured distance.

In some cases it is desirable to know the depth from the front to the back of a group or like which it is desired to photograph in order to obtain a point on the focussing scale F to which the camera lens may be set, or a distance at which the operator should stand away from the foreground or centre of the group as may be desired. The device is sighted and levelled as before described, and one of the sight lines D is sighted at the ground level of the foreground of the group or like, and the ground level of the background of the group. This gives you two readings on the range scale, the difference being the depth of the group or like. Presume that as a result of this setting the sight lines D are disposed as in Fig. 4. The points indicated will be about 8' and 12' 9" respectively giving a depth of 4' 9". This immediately leads one to the shadow G pointed to by the arrow 4 and thence to the lens stop of your camera, say in the 10.5 cms. lens column namely $F^8$ arrow 7 and by setting your lens to 10 ft. arrow 5, you will be sure of accuracy. Should the shadow cone be that marked with arrow 6 covering a depth of about from 10 ft. to 28 ft. on the outer scale, the stop required will still be in $F^8$ but the setting will be at 15 ft. arrow 8.

It may occur that the user is not satisfied with the result obtained as before mentioned and that his selected stop is not quite suitable. It also may happen that the lines D cut one or more of the shadow curves G and give him a choice of curves. Knowing the depth of his group he may set his lines to a curve G which gives him in the range or outer scale his depth distance. He will then find his focussing distance has varied and he may require to move his camera back or forward to give the correct focussing distance at the new stop he requires to adopt. It will generally be found in a case like this that he will require to move backwards from the object. No calculation is needed other than those previously mentioned.

I have referred previously to a construction of a pivot point $D^1$ for sight lines or members D and for the convenient use of rubber bands. As is well known rubber bands can be obtained in a variety of colours, and while a green band may answer most purposes, for sighting on to green grass it may lead to error. Similarly a blue band may not always be desirable. Again some users may be used to colour defects as to vision. Therefore the said construction and use of rubber bands facilitates the use of colour bands to suit the user or subject.

Whilst rubber bands as sight lines are as before mentioned particularly adaptable, I may use pivoted sight lines of any material, and in some cases, of some material width, with a suitable surface on which to sight. The sight bands may be wider towards their outer ends.

I have also referred to the device as being of quadrant shape, such shape accommodating itself to the various scales or markings employed, and the easy use of the rubber bands. I wish it however, to be understood that the device may be rectangular, triangular or any other shape, all so long as the scales and charts may be incorporated thereon and the sight lines incorporated as before described.

In constructing the group for distance marking it will be generally assumed that the eye is some four inches from the top of the user's head.

The use of the hereinbefore described device will enable a high standard of enlargement to be made from photographs taken with ordinary cameras.

If the device is desired to be used to find the approximate heights of buildings, such heights may be ascertained by first levelling the device as before described then turning the instrument until the rear edge is horizontal and moving out of the sight bands to a position up which it can be sighted up to the top of the building, the user standing 50 ft. away from the centre of the base of the object in which case the figures on the distance scale must be multiplied by ten.

This 50 ft. is obtained by setting a sight band to the 50 ft. on the range scale and then backing away until the band cuts the base of the selected object.

For more expert photographers who may select what is termed their own circle of confusion which involves considerable calculation and further calculation every time the circle is changed, the device hereinbefore described selects the said circle, and if experiment shows the results either too fine or too indistinct then by altering the sight lines but without altering the stop, the result desired may be achieved entirely without calculation. Presume the original setting was one where the sight lines included one of the shadow divisions G on the outermost arcuate line. Then by taking another shadow G say one, two, or three further up and setting the sight lines accordingly, the user knows that whilst using the original stop his result will not be so fine. Similarly if the stop is selected higher up the zone scale and he wishes finer results, over a more limited distance, he will move his sight lines to cover shadow G which is lower down or further outwards and so on.

Again judgment may be made as to the focusing distance indicated by the sight lines with regard to the selected shadow G focussing nearer the inner end will bring up the foreground and nearer the outer end will bring up the background.

When cameras other than the fixed focus type are used true zone focussing is obtained and such zones of which, in the example illustrated, there are 30, available according to the focal length, stop, and fixed scale setting, are automatically set to a standard of a circle of confusion of less than 1/1200 of an inch, and such pitch of technical excellence in focussing is available for the user of the simplest and most inexpensive of focussing cameras, without necessitating calculation.

Negatives produced by the aid of the instrument will be higher in detail value than is possible when focussing by eye with a reflex camera or ground glass screen.

The user of the instrument actually can visualize on the ground, the zone covered at any moment by the lens he is using taking of course, into account the stop and focus scale setting.

The instrument will not be in error even if used somewhat carelessly, because the zone shades off at either end and does not go immediately out of focus.

The position the camera user is required to take in respect to the object is indicated to include a certain depth of zone. In some forms of instrument the range scale, now indicated as short, tall, and average, may be replaced by one scale and an eye level finder capable of being lifted or lowered provided in connection with the upper part of the instrument.

What I claim as my invention is:

1. Means for ascertaining the range of sharp focus of a camera or the like having a lens, said means including a plate having thereon means establishing a sight line fixed relatively thereto, means defining a pivot point at the end of the sight line adapted to form the point from which sight is taken, a plurality of sighting members radiating from said point, and focal zone indicia arranged concentric of said point for embracement between said sighting members.

2. Means for ascertaining the range of sharp focus of a camera or the like having a lens, said means including a plate having thereon means establishing a sight line fixed relatively thereto, means defining a pivot point at the end of the sight line adapted to form the point from which sight is taken, a plurality of sighting members radiating from said point, and focal zone indicia arranged concentric of said point for embracement between said sighting members, said indicia being concentric to said pivot point, said indicia comprising a series of radially disposed groups and the plate having radial indicia each connecting the several members of a respective group.

3. Means for ascertaining the range of sharp focus of a camera or the like having a lens, said means including a plate having thereon means establishing a sight line fixed relatively thereto, means defining a pivot point at the end of the sight line adapted to form the point from which sight is taken, a plurality of sighting members radiating from said point, said indicia being disposed in radially spaced sets concentric of said pivot point, and a table of lens stops and lens focal lengths arranged at one end of the sets of zone indicia and having radial columns each arranged for a given lens focal length and each column having lens stop indicia arranged oppositely associated with a respective set of zone indicia.

4. Means for ascertaining the range of sharp focus of a camera or the like having a lens, said means including a plate having thereon means establishing a sight line fixed relatively thereto, means defining a pivot point at the end of the sight line adapted to form the point from which sight is taken, a plurality of sighting members radiating from said point, said indicia being disposed in radially spaced sets concentric of said pivot point, and a tabulated set of indicia indicating distance from the said means to the object to be photographed and extending arcuately around the periphery of the portion of the plate covered by the zone indicia.

5. Means for ascertaining the range of sharp focus of a camera or the like having a lens, said means including a plate having thereon means establishing a sight line fixed relatively thereto, means defining a pivot point at the end of the sight line adapted to form the point from which sight is taken, a plurality of sighting members radiating from said point, said indicia being disposed in radially spaced sets concentric of said pivot point, and a tabulated set of indicia indicating distance from the said means to the object to be photographed and extending arcuately around the periphery of the portion of the plate covered by the zone indicia and divided radially into sets each arranged for a respective height of the observer's eye.

DONALD ERIC HARDIE.